(12) United States Patent
Schlemmer et al.

(10) Patent No.: US 9,272,487 B2
(45) Date of Patent: Mar. 1, 2016

(54) METHOD FOR PRODUCING A DECORATIVE LEATHER ELEMENT

(75) Inventors: Christian Schlemmer, Landshut (DE); Rudolf Aichner, Kirchberg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 659 days.

(21) Appl. No.: 13/322,244

(22) PCT Filed: May 17, 2010

(86) PCT No.: PCT/EP2010/056710
§ 371 (c)(1),
(2), (4) Date: Jan. 18, 2012

(87) PCT Pub. No.: WO2010/136348
PCT Pub. Date: Dec. 2, 2010

(65) Prior Publication Data
US 2012/0107571 A1 May 3, 2012

(30) Foreign Application Priority Data

May 28, 2009 (DE) .......................... 10 2009 026 537

(51) Int. Cl.
*B32B 3/00* (2006.01)
*B23P 11/00* (2006.01)
(Continued)

(52) U.S. Cl.
CPC ... *B32B 7/12* (2013.01); *B32B 3/14* (2013.01); *B32B 9/02* (2013.01); *B32B 38/185* (2013.01);
(Continued)

(58) Field of Classification Search
CPC .......... B32B 3/30; B32B 27/08; B32B 38/10; B32B 37/12; B31F 1/07; B31F 2201/0738; G02B 5/124; A43D 43/00; A43D 47/00; A43D 63/00; A43D 27/00; A43D 29/00; Y02E 30/40; B21D 53/88; B23P 15/00; B29K 2021/00; E21B 19/16; H01L 21/6835
USPC ................... 428/172; 69/21; 29/428; 156/249
See application file for complete search history.

(56) References Cited

U.S. PATENT DOCUMENTS 6,013,210 A * 1/2000 Gardner, Jr. ................. 264/40.1
6,013,323 A * 1/2000 Klayder et al. ............... 427/384

FOREIGN PATENT DOCUMENTS

DE 197 52 058 A1 5/1999
DE 101 43 883 A1 3/2003
(Continued)

OTHER PUBLICATIONS

Machine_English_Translation_FR_2913028_A1; Taverne, Francois; Leather Covering Part; EPO; whole document.*
(Continued)

*Primary Examiner* — Tahseen N Khan
(74) *Attorney, Agent, or Firm* — Finnegan, Henderson, Farabow, Garrett & Dunner LLP (57) ABSTRACT

The present application relates to a method for producing a composite body comprising a flexible decorative material for use as decorative trim having a visible surface in a motor vehicle. The method comprises first joining a plurality of material pieces to form a material block, and then severing one or more composite bodies from the material block. The severing is carried out such that the severed composite body contains several of the material pieces. Thereafter, the severed composite body is applied to a visible surface of a decorative trim.

23 Claims, 3 Drawing Sheets

(51) Int. Cl.

| | | |
|---|---|---|
| *B32B 38/10* | (2006.01) | |
| *C14B 99/00* | (2006.01) | |
| *B32B 7/12* | (2006.01) | |
| *B32B 3/14* | (2006.01) | |
| *B32B 9/02* | (2006.01) | |
| *B32B 38/18* | (2006.01) | |
| *B44C 1/18* | (2006.01) | |
| *B44C 3/02* | (2006.01) | |
| *B60R 13/02* | (2006.01) | |
| *C14B 7/02* | (2006.01) | |
| *B32B 37/12* | (2006.01) | |

(52) U.S. Cl.
CPC . *B44C 1/18* (2013.01); *B44C 3/025* (2013.01); *B60R 13/02* (2013.01); *C14B 7/02* (2013.01); *B32B 37/12* (2013.01); *B32B 2317/08* (2013.01); *B32B 2605/003* (2013.01); *Y10T 29/49826* (2015.01); *Y10T 428/24612* (2015.01)

(56) References Cited

FOREIGN PATENT DOCUMENTS

| | | |
|---|---|---|
| DE | 102 11 171 A1 | 1/2004 |
| DE | 102004025570 A1 * | 12/2005 |
| DE | 10 2006 019 675 B3 | 11/2007 |
| DE | 10 2004 025570 A1 | 12/2008 |
| DE | 10 2007 059233 A1 | 6/2009 |
| FR | 2 240 980 A1 | 3/1975 |
| FR | 2 913 028 A1 | 8/2008 |
| FR | 2913028 A1 * | 8/2008 |
| WO | WO 2008/145372 A1 | 12/2008 |

OTHER PUBLICATIONS

Machine_English_Translation_DE_102004025570_A; Kuhlmann, K; Plastic Automobile Part Manufacture Incorporating Foamed Components; Dec. 15, 2005; EPO; whole documen.*

International Search Report and Written Opinion of the International Searching Authority for International Application No. PCT/US2011/041573, mailed Feb. 24, 2012 (10 pages).

International Preliminary Report on Patentability, mailed Oct. 19, 2011, for PCT/EP2010/056710 (6 pages).

International Search Report for International application No. PCT/EP2010/056710, dated Aug. 25, 2010 (4 pages).

* cited by examiner

METHOD FOR PRODUCING A DECORATIVE LEATHER ELEMENT

RELATED CASE INFORMATION

This application is a 371 US National Stage Application of International Application No. PCT/EP2010/056710, filed on Feb. 17, 2010, claiming priority to German application no. DE 10 2009 026 537.6, filed on Feb. 28, 2009, the entire disclosures of which are incorporated herein by reference.

TECHNICAL FIELD

The invention relates to a method for producing a composite body comprising a flexible decorative material, preferably for use as a trim part having a visible surface, in particular in vehicles, and preferably in a motor vehicle. Further, the invention relates to a decorative element of a vehicle part having a visible surface.

PRIOR ART

Nowadays, trim parts in a motor vehicle are usually realized with an embellished surface, with a trim material, in particular covered with leather or provided with trim woods or aluminum parts. At the same time, there is an ever increasing desire to achieve individualized interior designs, particularly for motor vehicles in the upper price range. For this, it is necessary that any trim parts present in the vehicle interior can be designed as individually as possible, without unnecessarily increasing the production costs at the same time. One difficulty in individualizing trim parts consists in a limited number of available materials, and a further difficulty consists in limiting the amount of work that may be expended to produce such a trim part, in order to keep the costs of the trim part as low as possible.

SUMMARY OF THE INVENTION

The object of the present invention consists in providing a method for producing a composite body comprising a flexible decorative material, preferably leather, preferably for use as a trim part having a visible surface, in particular in a vehicle, particularly preferably in a motor vehicle, and in making it possible to realize a decorative element of a vehicle part having a visible surface. The method is intended, at the same time, to enable the trim part to be individualized in an efficient manner.

The object is achieved by the subject-matters of claims 1 and 13. Preferred further features of the invention are defined in the dependent claims.

A method, according to the invention, for producing a composite body comprising a flexible decorative material, preferably leather, for use as a trim part having a visible surface in a motor vehicle comprises the following steps: joining together, in particular bonding, a plurality of material pieces to form a material block, and parting off one or several composite bodies from the material block, such that the parted-off composite body includes several of the material pieces. Further, the method comprises applying the parted-off composite body to a base for the purpose of forming a visible surface of a trim part, the material pieces being disposed next to one another along the surface.

"Leather" in this text is understood to be, on the one hand, natural leather and, on the other hand, artificial leather, i.e. synthetic leather or leather-like materials. "Leather" in this context also includes leather fiber materials ("reconstituted leather") produced from leather oddments of the leather industry, natural latex (binder), natural fats and tanning agents, leather powder materials and braided leather. As an alternative and/or in addition to the leather defined above, the composite body comprising a flexible decorative material, in particular leather, can also have elements composed of textile, wood, bark, nonwoven fabric, felt, spacer fabrics, plastic, paper, cellulose, cork, natural fibers (e.g. flax, sisal), natural-fiber composite materials (e.g. Nafacryl=natural-fiber thermosets), metal or similar materials.

The materials can be pretreated, either over their entire surface or partially, e.g. coated, dyed and/or mordanted, it being possible both to apply the pretreatment material to the surface of the material and to put it into the depth of the material. At the same time, it is also possible for one or several of the additional elements of the composite body to provide functional properties such as, for example, the guiding of light.

An example of a trim part can be integrated into an instrument panel, a roof lining or, also, an airbag covering. In the case of an airbag covering, the composite body can be defined in such a way that one or several defined break edges are provided to enable the airbag to be actuated in a faultless, unimpeded manner. The break edges can be created by retroactively weakening the composite body. It is also possible, however, for the material pieces to be joined to form a material block in such a way that layers that have a lesser adhesion form the break edges in the resulting composite body. This can be achieved, for example, by partial bonding or the use of adhesives especially suitable for this.

Besides pure trim parts, functional elements that are provided with the composite body, at least in partial regions, or that are themselves also realized as composite bodies, can also be produced by the method according to the invention. Moreover, in addition to being used in cars, the composite body can also be used in other motor vehicles such as, for instance, buses, and in other means of transport or vehicles such as ships, aircraft, trains and the like.

At the same time, the material pieces joined together to form the material block can both be like pieces and, preferably, differing pieces. Differing material pieces are particularly suitable for individualizing the trim part produced by the method.

At the same time, the differing material pieces can preferably vary in a direction that lies in a cutting plane and, alternatively or particularly preferably, additionally in a direction that does not lie in a cutting plane. One example of this can be a variation in the thickness of individual material pieces, or of several material pieces, in particular of individual layers or of several layers. In addition, variations of other parameters of the material pieces can also be provided in one or several of the above-mentioned directions, in order to create a particularly distinct individualization.

At the same time, the joining together of the material pieces to form the material block and the parting-off of a composite body from the material block are effected in such a way that a parted-off composite body preferably forms a flat layer, or can be transformed, e.g. by elongating or stretching, into a flat layer that is also flexible, depending on the material. "Flat" in this case does not mean that the layer must extend along a level plane, but, rather, the layer can also include curvatures, kinks and the like. The shape of the layer in this case depends, in particular, on the surface of the trim part. The thickness of the parted-off composite body can also vary according to the requirement.

The material block from which a composite body is parted off can itself constitute a composite body in this case. In other words, the composite body can be cut out of the material block, e.g. by machining (parting-off) the edges. This is usually the case if the material block has more than one layer. In this case, the material block can be machined further. For example, functional elements such as elements that guide light or air can be made in recesses, and perforations can be produced and/or colorings and/or coatings can be effected.

In creating the material block it is possible to define a particular contour for the composite body ("contouring"). The contour of the material block is therefore to a large extent freely selectable, and can be adapted to the subsequent use of the composite body and/or material block. The material block in this case can use, for example, a half-moon shaped or wave-shaped auxiliary part. The individual material pieces can be placed on the latter and joined to one another. The auxiliary part can then be removed, and the material block already has composite layers that are pre-shaped in a stable manner.

In addition, it is possible for the material pieces for the material block and/or for the composite body to be provided with a surface contour before the joining operation, such that contours of two adjacent material pieces can mesh in the manner of an indented joint. On the one hand, this makes it possible to achieve new optical effects and, on the other hand, the stability of the body is improved by the form closure realized thus.

The appearance of the composite body is determined, on the one hand, by the number of individual material pieces of the material block and also, on the other hand, by their size, shape, color, material and sequence and by the manner in which they are joined together. In addition, the appearance of the composite body also depends on how the composite body is parted off from the material block.

In one of the simplest examples, a plurality of flat leather pieces are bonded by their surfaces to one another, thereby creating a rectangular material block. Cutting off a surface along a cutting plane that runs, for example, perpendicularly in relation to the extent of the individual material pieces then results in a composite body having a plurality of strips of leather, according to the number and sequence of the material strips joined to form the material block.

Depending on how the thicknesses, colors or other parameters of the material pieces vary, a multiplicity of further composite bodies, which each differ from one another and are therefore individualized, can be produced by parallel cuts. Clearly, this method can be applied for any manner of joining together individual material pieces to form a material block.

In particular, it is also possible for material pieces that are not flat pieces, but spherical or randomly shaped, for example, to be joined together by appropriate adhesives or the like to form a material block, from which composite bodies can then be parted off.

According to the invention, the composite body is then applied to a visible surface of a trim part, such that the surface of the trim part is given an individual appearance.

Preferably, before being joined together, the material pieces are given a defined or random shape, preferably being skived, split, skive-split, ground or bent. The defined or random shapes of the material pieces can be achieved, for example, through differing thicknesses, contours, openings, lateral extents and the like. It is also possible for individual parts having a substantially random shape to be joined together directly, i.e. without prior machining, to form the material block.

The preferred methods of bringing the material pieces into a defined or random shape before they are joined together have been mentioned above, and are to be explained briefly in the following:

"Skiving" in this application means the removal of a part of a leather hide that is opposite the high-quality side of the leather hide (i.e. the "poor-quality side"). The parted-off part of the leather hide in this case is generally no longer coherent, but separates into a multiplicity of individual parts. "Splitting", on the other hand, denotes dividing of a leather layer into two continuous leather layers, of which one has the higher-quality side and the other has the lesser-quality side. In the case of "skive-splitting", a leather hide is placed over a template that has elevations or depressions at defined points. A knife that is normally used for splitting is then moved, for example, at a short distance above the leather hide. At the points at which the template causes the leather hide to protrude above the path of the knife, parts of the leather hide are cut off, either wholly or partially. In this case, the cut-off parts can separate into a multiplicity of individual parts, as in the case of skiving, or they can remain coherent, as in the case of splitting.

In addition to the skiving and skive-splitting, the material of the material pieces for the material block can also be machined, for example, by laser machining, grinding, milling and polishing. For the purpose of skive-splitting or splitting, a sharp blade in the form of a band knife makes it possible to achieve preferably an exact removal behavior, which is more uniform than in the case of grinding. In this way, no dust is produced and there is no tearing out of fibers, which would be a risk in the case of grinding and milling.

Material pieces that are given a defined or random shape in one of the above-mentioned ways or, also, otherwise, and then joined together to form a material block make it possible to achieve a virtually unlimited multiplicity of individual shapes of the composite body parted off from the material block. Individualized surfaces of a trim part in a motor vehicle can thus be produced without difficulty, without these trim parts becoming particularly cost-intensive as a result of a large work input.

In a preferred embodiment, the material pieces have flat layers of a thickness of between 0.15 mm and 10.0 mm, preferably between 0.4 mm and 1.4 mm. Such flat layers can be joined together particularly efficiently to form a material block, for example by bonding them to one another. A material block created by these layers is suitable for simultaneously producing a multiplicity of composite bodies, such that it enables an individual trim part in a motor vehicle to be produced in a particularly efficient manner.

Preferably, the material pieces are joined flatly to one another. Thus, preferably, the material pieces can be joined to one another along their surfaces, for example by bonding agents (hot-melt adhesive, dispersion adhesive, adhesive film, adhesive web).

In addition, there are also other possibilities for joining together material pieces. If the material pieces are, for example, shapes other than layers of a particular thickness, for example pieces that have a complex shape, such a material piece can also be enclosed in surrounding adhesive, or a material piece can be clamped in between two surrounding material pieces that are joined to one another by, for example, bonding agents.

Preferably, the material pieces are randomly shaped in three dimensions. This can mean that the material pieces, which can be flat layers, for example, vary in their thickness as a result of skive-splitting or the like.

The layers can also differ in the magnitude of their lateral extent, i.e. perpendicularly in relation to their thickness, or have been individualized by corresponding shaping processes. It is particularly preferred that the material pieces be uniformly dimensioned in their lateral direction, in order to obtain a uniform material block, but that they be of differing dimensions perpendicularly in relation to the lateral extent. At the same time, the layers can have thicknesses that, on the one hand, differ from one another, but that are of the same thickness within a layer. On the other hand, it is also possible for individual layers or each of the layers to have partial regions having differing thicknesses. "Lateral" in this context denotes an extent perpendicular to which differing layers are joined to one another.

Advantageously, the material pieces are of shapes, in particular thicknesses, that differ from one another, at least in regions. Such an embodiment of the material pieces makes possible a material block that can be individualized in a particularly simple manner, and consequently a multiplicity of composite bodies produced from the material block.

Some possibilities for realizing differing thicknesses or other differing shapes have already been mentioned above. In addition, it is also possible, for example, for individual material pieces to be rolled together, kinked, wrinkled, or otherwise altered in their shape.

In a preferred embodiment, the material pieces comprise functional pieces, in particular functional layers, which are joined between adjacent material pieces. Examples of such functional pieces are transparent layers, polymer, wood, cork, nonwoven fabric, textile, polyester, polyamide, polycarbonate, TPE, TPU, silicone, PVC, PU or mixed pieces.

In the case of a transparent functional layer, for example, it can be possible to guide light in the functional layer and to scatter it out in a controlled manner, e.g. also only partially, such that, for example, it is possible to achieve an illuminated strip or illuminated points along an individualized surface. A functional piece within the meaning of the invention in this case is a piece that has been given a function, i.e. that can produce an effect. This effect can be produced actively or passively, or only by interaction with a further element. An at least partially light-transparent layer can be realized, for example, by appropriate materials (latticed materials, spacer fabrics, transparent polymers, etc.). In addition, openings, perforations and/or the like can be made by post-machining, e.g. by laser treatment.

The light-transparent layer can at the same time be realized as a layer that is permeable to gas, in particular air. This requires an appropriate selection of material and/or post-machining.

According to a preferred method, the material pieces are joined together by an adhesive, in particular a polymer. This constitutes a particularly simple and secure manner of joining together the material pieces. Alternatively, however, it is also possible, for example, for the material pieces to be clamped together, fused together or otherwise joined to one another.

In a preferred embodiment, the joining together results in a substantially rectangular material block being created. Such a substantially rectangular material block makes it easier to create composite bodies that are suitable for further processing, and is therefore renders the method more efficient. In addition, however, it is also possible to create the material block in a different shape. In particular, it is not necessary for the material block to have continuously or mainly right angles or straight-line edges.

In a particularly preferred embodiment, the parting-off of one or several composite bodies is performed by cutting along a surface that intersects several of the material pieces. The surface in this case need not be a flat surface but, for example, can also be bent or have sharp kinks. The surface can also separate off from the material block a three-dimensional structure, for example a smaller material block ("daughter block") or a relief that runs according to the trim part to be covered. In addition, it is also possible for one or several composite bodies to be parted off from the material block by, for example, punching, cutting, sawing or other methods.

It is preferred that, at the same time, the one alignment or several alignments, or the main direction or main directions of the surface along which parting-off is effected be selected in a random manner. A random selection of the surface along which parting-off is effected results in an additional individualization of the resultant composite bodies.

Even in the case of a plurality of like material blocks, resulting from a like grouping of material pieces to form the material blocks, individualization can still be achieved through the orientation of the cut surface. The alignment of the cut surface is determinant, for example, in the thickness of the individual material pieces in the composite body, as well as in their alignment. A multiplicity of composite bodies that differ individually from one another can thus be created from one material block, without this negatively affecting the efficiency of the production method.

A decorative element of a vehicle part according to the invention has a visible surface and a plurality of material pieces, which comprise leather and which are joined together, preferably bonded to one another, disposed next to one another along the surface. Such a decorative element can be, in particular, the product of a method described above. Because of the plurality of material pieces, comprising leather, that are joined together and disposed next to one another along the surface, the desired individualization of the decorative element, and therefore of the vehicle in which the vehicle part is fitted, is achieved.

The plurality of material pieces that are joined together can differ, with regard to differing decorative elements, in respect of a multiplicity of parameters. On the one hand, it is possible to use a multiplicity of differing materials or colors; on the other hand, these can be joined and aligned to one another in a multiplicity of differing ways. A particularly efficient possibility for achieving this is indicated by the above method.

Advantageously, the material pieces have strips of a thickness of between 0.15 mm and 10.0 mm, preferably between 0.4 mm and 1.4 mm. In order to discern an individuality even on a relatively small space, it is advantageous to use strips of the above-mentioned thickness. Alternatively, however, it is also possible to use strips that are significantly smaller or, also, significantly larger. In addition, it is also possible to use material pieces that are not in the form of strips but disposed, for example, next to one another in the manner of a flecked carpet.

Even in the case of a material block composed of a plurality of flat material pieces, it can be the case that the material pieces are joined together substantially perpendicularly in relation to one another or, also, randomly. It is possible for individual material pieces to be aligned in a first orientation and other material pieces to be aligned in a different orientation, for example perpendicular to the first orientation. Material pieces of greatly differing shapes can also be joined to one another, in order to form the material block.

In particular, a volume of non-layer type material pieces, for example small particles and the like, can also be inserted between individual layer type material pieces.

Preferably, the material pieces comprise functional pieces, in particular functional strips, which are disposed between adjacent material pieces. That which has been written above concerning the functional pieces applies analogously to the functional pieces. In particular, transparent strips can create surprising effects on the decorative element, and are therefore a possibility for the design of a surface of the decorative element.

In a preferred embodiment, the material pieces are joined together by an adhesive, e.g. hot-melt adhesive, dispersion adhesive, adhesive film, adhesive web or a polymer. The adhesive can contain additional fillers, in order to create special optical effects (e.g. fluorescing adhesives, adhesives having a metallic or mother-of-pearl effect). As already explained above in relation to the production method, it is also possible, however, for material pieces to be joined to one another in another manner.

Advantageously, the decorative element is produced according to the method described above.

The composite body can be laminated, sewn, screwed, bonded, latched or clamped, over its full surface area, onto a shaped part. Alternatively, it is possible for the composite body to be only partially fastened to the shaped part, thus, for example, only in the edge region, in a manner similar to a cover fabric in the case of an upholstered furniture item. It is also conceivable to insert intermediate layers between the composite body and the shaped part, the intermediate layers enabling special effects, e.g. haptic effects, to be created.

After having been produced, the composite body and/or the material block can be machined further. Possible machining steps for machining at least partial regions are, for example, trimming, punching-out or milling-out partial regions, possibly with subsequent filling of the thus produced openings, skiving, splitting, skive-splitting, laser machining, forming, contouring for the purpose of adapting to a shaped part, coloring, mordanting, coating, imprinting, back-filling, backing with haptically or optically functioning intermediate layers and/or back-lighting. Combinations thereof are also conceivable, for example firstly a partial coloring into the depth of the composite body, and subsequent skiving to create special effects. It is also possible to use the composite body to produce further material blocks in combination with further, different materials.

The individual material pieces of the material block can preferably differ from one another in their color, but this is not absolutely essential. The layers can be selected and arranged in a defined or random manner in respect of their colors, thicknesses, geometries, material types or functionalities.

For the facing of a ventilation outlet, for example, it is preferred that the composite body and, in particular, the material block have defined recesses, which coincide with the ventilation slots of the ventilation outlet after the composite body has been applied thereto. Such openings defined by recesses in the composite body or material block can also cover other openings, apart from ventilation openings. Examples of these are loudspeakers, light fittings or sensors.

It is also possible for individual material pieces of a composite body, after the latter has been parted off from the material block, or one or several of the composite surfaces, to be dilated between adjacent material pieces, such that one or several openings are produced. The openings can also be created in that the individual material pieces are only partially adhesive bonded during the production of the material block. Apart from their use described above, such openings can also be filled. Polymers, stones, glass and textiles are possibilities for this purpose.

Leather of the material pieces, of the material block and/or of the composite body can be back-filled with an appropriate material. Polymers are an example of such a material. The polymer for back-filling a leather structure can have light-transparent properties, such that allows a correspondingly realized composite body to create special optical effects.

Individual material pieces, or all material pieces, can be impregnated before being joined together to form a material block. On the other hand, it is also possible for the material block as a whole or an already parted-off composite body to be sealed with an impregnating agent or the like and protected against external influences.

Preferably, after the composite body has been parted off, a layer of lacquer can additionally be applied to the composite body, along a defined pattern. A masking template, by means of which the visible side of the composite body can be lacquered over, is particularly suitable for this purpose.

Besides trim parts in the strict sense, the composite body according to the invention can also be used to cover trim parts in the widest sense, thus, for example, parts of the seat or head restraint.

It is also possible for the composite body to be made thinner at selected points, for example by laser machining. An example of an application for this is to create a defined break line in the case of an airbag covering.

The composite body can also be used to represent organic structures. "Organic structures" in this context means that differing and irregular layer composites are provided. A differing material consistency can result in differing amounts of material being removed, resulting in the appearance referred to as an "organic structure". "Organic structures" can also be created by contoured and/or offset cutting or grinding, or through the use of templates. The term "organic structure" also includes the effect that is produced when a composite body is brought into a constrained position in which, for example, torsional forces act upon the individual material pieces. An example of this arises in the production of a trim part having a preferred composite body wherein the composite body is brought into a constrained position by the shape of the trim part. After the composite body has been trimmed to size after it has been applied to the trim part, the composite body returns to an untensioned state, such that an edge contour between adjacent material pieces can be irregular. The constrained position can also be created by a template.

It is also possible for the composite body to be shaped so as to form a "cord". Such a cord can have various cross-sectional geometries. The cord can then be inserted, for example, into a parts slot of a vehicle part or, preferably, wrapped in a transparent material, coating, film or a textile. The textile in this case can also have a mesh structure. The cord can also constitute a decorative seam. Several such cords can be sewn to one another.

The composite body can be shaped by thermoforming. For this, it might be necessary to apply a polymer coating to the composite body before the thermoforming process, in order to enhance the thermoforming.

Preferably, a composite body can also be sealed on the back side, to enable back-foaming, back-casting, back-spraying and the like to be performed.

Further advantages and features of the invention are disclosed by the claims in their totality, and by the following description of the figures.

WAYS OF EMBODYING THE INVENTION

Figures 1, 2, 3:
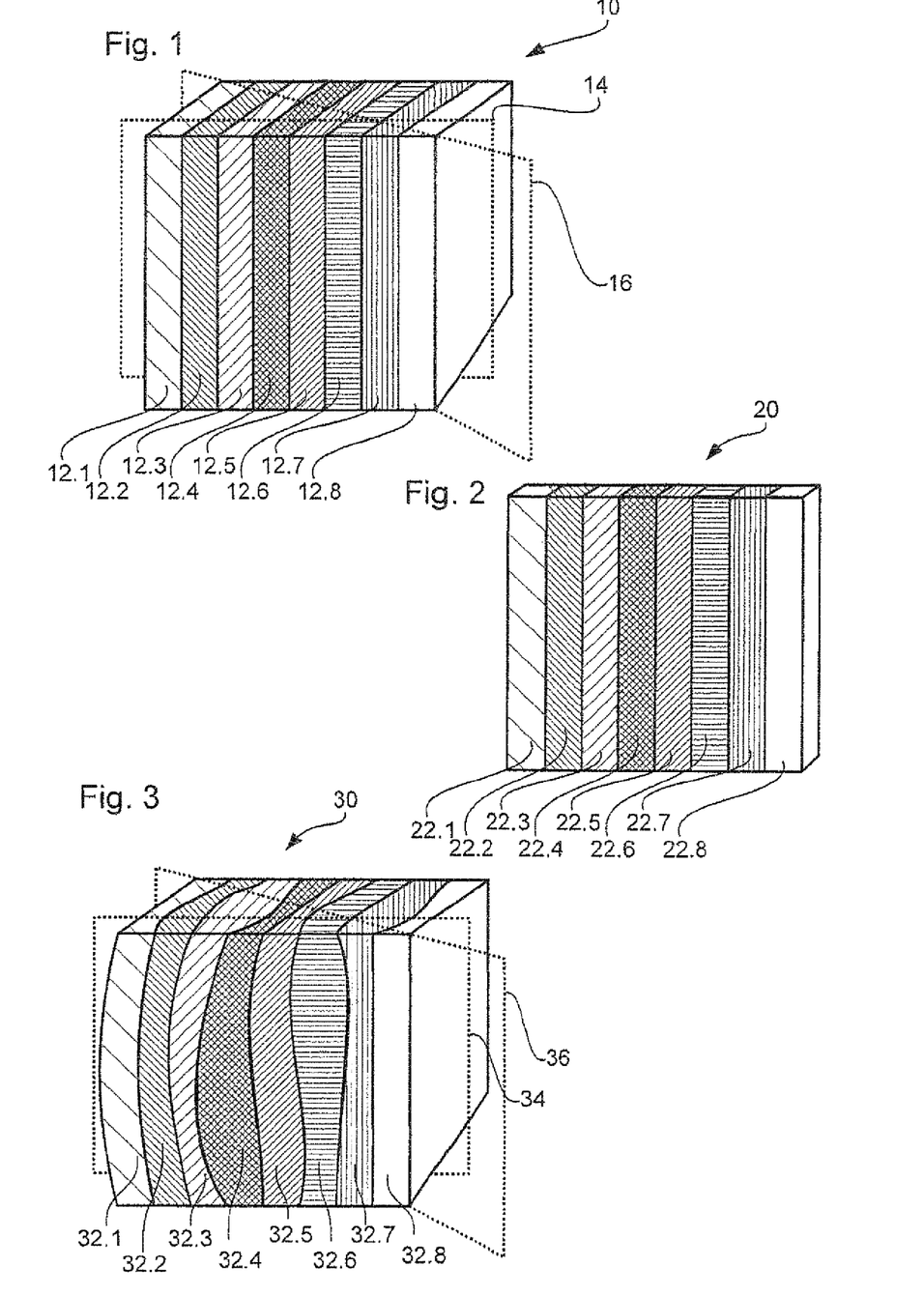
FIG. 1 shows a material block, which is joined together from a plurality of material pieces.
FIG. 2 shows a composite body, which has been created from the material block from FIG. 1.
FIG. 3 shows a material block composed of a plurality of material pieces of defined shape.

FIG. 1 shows a material block 10 composed of a plurality of material pieces 12.1 to 12.8. In the embodiment shown in FIG. 1, the material pieces 12.1 to 12.8 are layers of leather, which are joined to one another along respectively adjacent surfaces. In the embodiment shown in FIG. 1, the leather layers 12.1 to 12.8 are joined together by a bonding agent.

The material block 10 in FIG. 1 is in the form of a cube. A cube form, as a special form of a cuboid constitutes a particularly advantageous shape of the material block, because from this it is possible to part off a plurality of individual composite bodies of a defined size that, in particular, is rectangular or square and that is equal at least for the majority of the composite bodies.

Indicated in FIG. 1 are two preferred cutting planes 14, 16, along which a composite body can be parted-off from the material block. The cutting planes shown in this figure are given only by way of example, however, and can be turned in any manner, and also reshaped, as is shown, for example, the FIG. 4, which is described later.

It is possible to vary, for example, on the one hand, the manner of joining, in the sense of a sequence and choice of material of the material pieces and also, on the other hand, the orientation and shape of the cutting plane along which the one or several composite bodies are parted off from the material block. Thus, from a multiplicity of differing material pieces, it is possible to create a plurality of composite bodies, which each differ from one another. In addition, several composite bodies, as products of the same material block, can be structured so as to be like one another but to differ from products of other material blocks.

It is thereby possible to achieve particularly efficient production of individual or quasi-individual composite bodies that can trim a surface in a motor vehicle.

FIG. 2 shows a composite body 20 that has been created from the material block 10 from FIG. 1 by cutting along the cutting plane 14 in FIG. 1. The composite body 20 comprises a plurality of material pieces 22.1 to 22.8, which correspond to the material pieces 12.1 to 12.8 from FIG. 1. From the material pieces 12.1 to 12.8, which are each planes of leather, a corresponding grouping of individual strips 22.1 to 22.8, of the material of the leather layers 12.1 to 12.8 of the material block, has been created by the cutting along the cutting plane 14 in FIG. 1.

A cut along the cutting plane 16 in FIG. 1 would result in a correspondingly different composite body. FIG. 3 shows another embodiment of a material block 30. The material block 30 in FIG. 3 is similar to the material block 10 from FIG. 1 insofar as substantially layer-type material pieces 32.1 to 32.8 have been joined to one another to form the material block 30. In the embodiment shown here, also, the layers 32.1 to 32.8 have been bonded to one another.

Unlike the embodiment from FIG. 1, however, the material layers 32.1 to 32.8 have been at least partially machined, in particular by skive-splitting. This results in the thicknesses of the layers 32.1 to 32.8 differing locally from one another in such a way that the regular pattern of the composite body 20 from FIG. 2, produced from the material block 10 from FIG. 1, is altered. A correspondingly parted-off composite body from the material block 30 would not have parallel, straight strips located next to one another, but strips contoured according to the layer thickness of the material pieces 32.1 to 32.8.

In the embodiment shown in FIG. 3, additional individualization of the composite bodies is created as a result of the local thickness variation of the material pieces 32.1 to 32.8. The thickness in this case can be constant for each material piece, or it can be subject to a variation in thickness, in particular a continuous variation in thickness or a variation in thickness with or without discontinuities.

Apart from the individualization resulting from the structuring of the individual material pieces, in the embodiment shown in FIG. 3 further individualizing of individual composite bodies can clearly be created through the choice of the cutting plane, FIG. 3 showing two examples of a cutting plane 34, 36, which correspond to the cutting planes 14, 16 in FIG. 1.

Moreover, the material pieces 32.1 to 32.8 are not only varied along a direction in the cutting plane 34, but also have contours that vary perpendicularly in relation thereto. For a multiplicity of cuts along the cutting plane 34, or along a plane parallel thereto, therefore, it becomes possible to create respectively individual composite bodies.

Figures 4, 5, 6:
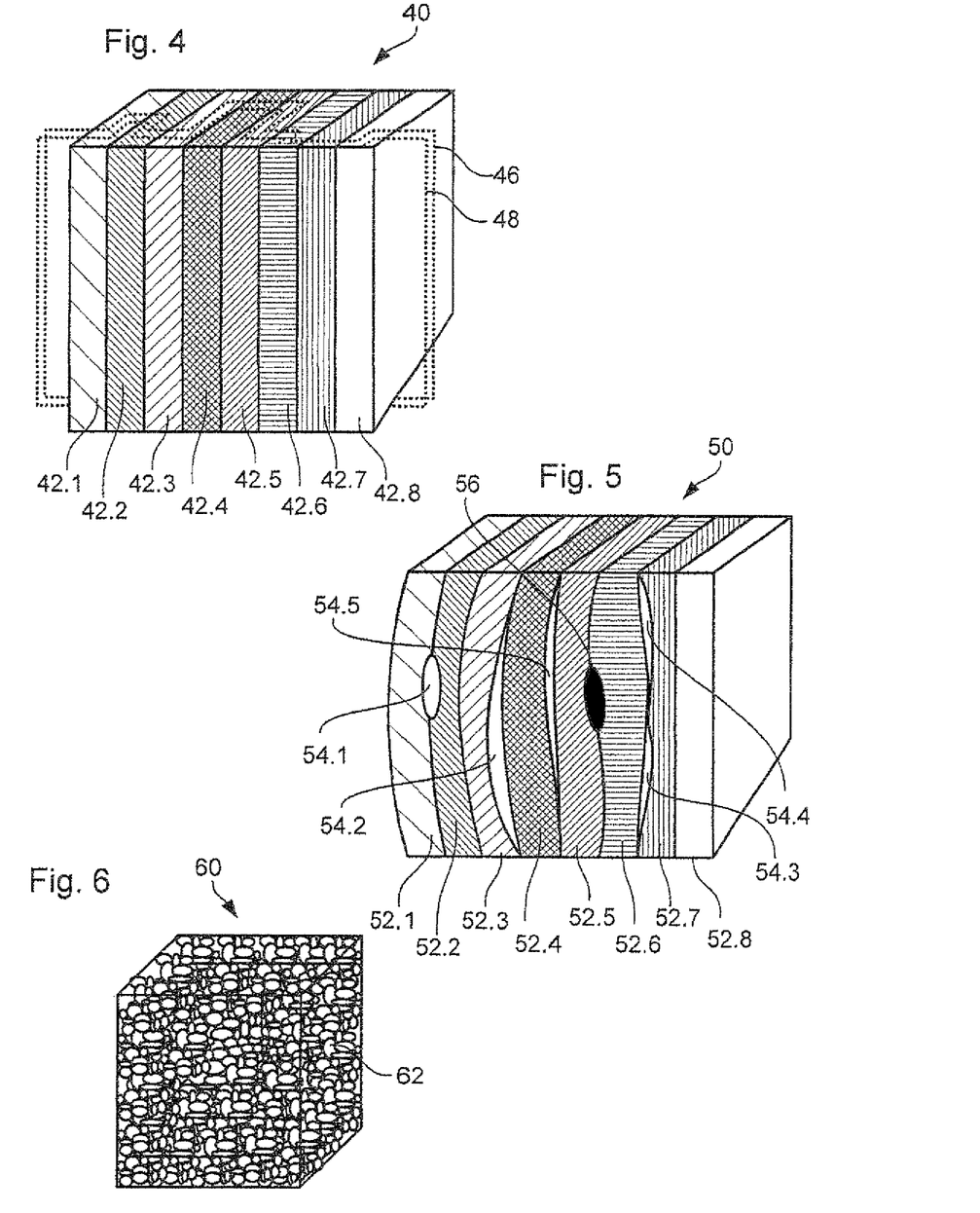
FIG. 4 shows the material block from FIG. 1, having an individual cut pattern for the composite body.
FIG. 5 shows a material block composed of a plurality of material pieces of defined shape and having material inclusions between the material pieces.
FIG. 6 shows a material block composed of a plurality of material pieces of undefined shape.

FIG. 4 shows a material block 40, which resembles the material block 10 from FIG. 1. The material block 40 is composed of a plurality of different material pieces 42.1 to 42.8, the material pieces 42.1 to 42.8 being constituted, in a manner similar to the embodiment from FIG. 1, by flat elements, in particular by layer elements, which are preferably made of leather.

FIG. 4 shows a pairing of cutting planes 46, 48, which extend through the material block 40, along an individual contour. The cutting planes 46, 48 in this case do not run through the material block 40 in a continuously planar manner, but in a contoured manner. This can enable a surface trim of a trim part in a motor vehicle to be formed in a particularly efficient manner if the surface of the trim part corresponds, for example, to the course of the cutting planes 46, 48. On the other hand, routing the cutting lines 46, 48 individually and, in particular, randomly makes it possible to further individualize the composite body, the cutting lines 46, 48 preferably running parallel in relation to one another in order to create a composite body of uniform thickness.

This is because the cut-out composite body, in its shape, does not have to conform to the cutting plane along which it was cut out, but can also be tensioned on to a plane.

The material pieces 42.1 to 42.8 correspond to the material pieces 12.1 to 12.8 of the material block 10 from FIG. 1. FIG. 5 shows a further embodiment of a material block 50. The material block 50 comprises a plurality of material pieces 52.1 to 52.8 that are joined to one another. The material pieces 52.1 to 52.8 are similar in their thickness to the embodiment shown in FIG. 3, in particular machined by skiving, splitting or, preferably, by skive-splitting.

Unlike the embodiment shown in FIG. 3, however, the material pieces 52.1 to 52.8 are not attached, e.g. bonded, flatly on one another with mutually opposing surfaces. In contrast to this, the material block 50 in FIG. 5 has, for example, recesses 54.1 to 54.5, in which a filler can be inserted. In this embodiment, a transparent polymer such as, for example, polyester, polyamide, polycarbonate, polyurethane, TPU, TPE, silicone, adhesive or mixtures can preferably be inserted as filling material. Such transparent fillings of recesses between adjacent material pieces 52.1 to 52.8 enable the composite body, from which the material block 50 is parted off, to provided functional properties. The inserts can then function, for example, as light guides, which help to illuminate the surface of the trim part. In addition, however, it is also possible, for example, for sensors for ambient light and the like to be connected to the surface of the trim part via the light-guiding inserts.

Alternatively, instead of the inserts 54.1 to 54.5, it is also possible for openings to be kept clear between adjacent layers of the material block 50, and thus between adjacent strips of the composite body, to enable, for example, ventilation slots and the like to be integral with the surface of the trim part. For the case of an air guide integrated into the composite body, it is recommended to impregnate or reinforce the surface of the air-guiding regions, in order to achieve dimensional stability. Hollow profiles (e.g. hoses made from rubber or silicone thermosets) can also be set into the composite body for this purpose.

Between two of the material pieces 52.5, 52.6, a recess 56 is provided with a different material and adhesive-bonded into the material block. The insert 56 can be, for example, of wood, cork, nonwoven fabric, textile, polymers or the like. Such elements can be used as an additional individualizing element, or also as a functional element. For example, it is possible for a push-button, a sensor or the like to be inserted. A recess between adjacent material pieces 52.1 to 52.8 can also remain clear, for example in order to leave a clear view of an element provided beneath the composite body. It may also be necessary, in connection with this, to allow an element, for example a switch, present on the part of the surface of the trim element that is to be covered with the composite body to pass through the surface of the composite body.

The insertion of transparent element or, also, other functional elements into the material block or into the composite body, and the provision of recesses in the composite body can be applied, in principle, to each of the embodiments shown here.

FIG. 6 shows another embodiment of a material block 60. In the embodiment shown in FIG. 6, the material block 60 is composed of a multiplicity of material pieces 62 of undefined structure. The material pieces 62 can be, for example, small material pieces of undefined shape, which can be joined together to form a material block, for example by bonding agents. In particular, the material pieces can also be residues, for example leather offcuts or the like.

Just like the material blocks described above, in principle the material block 60 can be machined in order to create an individualized composite body.

Figure 7:
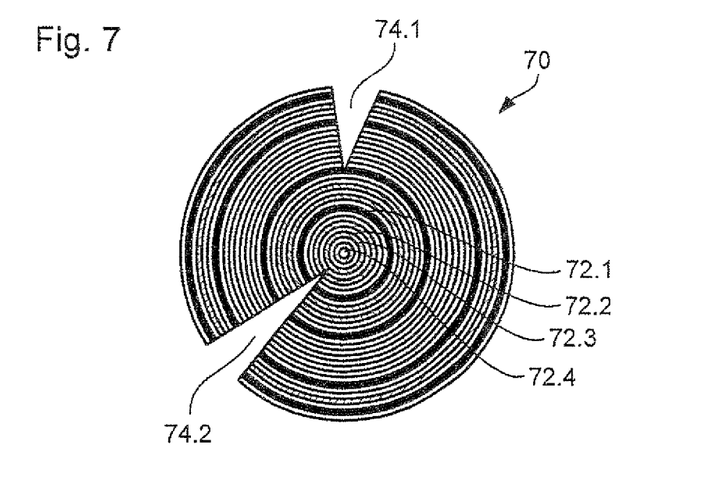
FIG. 7 shows a composite body of a further embodiment having concentrically disposed, annular material pieces.

A further embodiment of a composite body 70 is shown in FIG. 7. In this case, the composite body 70 has been parted off from a material block composed of layer-type material pieces lying concentrically around one another in the form of a cylinder, and now comprises a multiplicity of annular material pieces 72.1 to 72.4. In this case, the material pieces 72.1 to 72.4 are selected examples of material pieces from a multiplicity of different material pieces of the composite body 70. Alternatively, it may be preferred to provide spiral material pieces 72.1 to 72.4, it being easier in this case to join the material pieces together to form a material block. On the material pieces disposed concentrically in relation to one another, which are preferably connected to one another by bonding agents, the composite body 70 from FIG. 7 includes two recesses 74.1, 74.2, which project radially from a circumferential side in the direction of the center of the composite body 70. In principle, the composite body 70 can be machined, in particular cut, skived or split, like any other layer, in particular also after it has been parted off from a material block. Cutting along defined contours thus enables the composite body 70 to be used as an individual design of a surface of a trim element in a motor vehicle and adapted for a multiplicity of differently shaped surfaces.

The figures described above each show selected examples of composite bodies or material blocks that represent an embodiment of the invention. In addition, however, the concept of the invention also discloses a multiplicity of further possible embodiments that render possible a multiplicity of individual designs.

Figure 8:
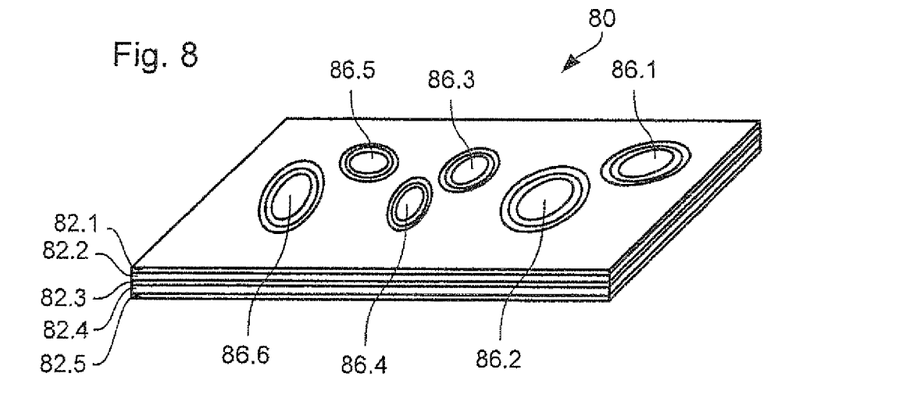
FIG. 8 shows a material block having defined surfaces recesses.

FIG. 8, moreover, shows a material block 80, which has been subjected overall to a machining process, in particular skive-splitting. Individual composite bodies have been parted off from the material block 80, which has a plurality of material pieces 82.1 to 82.5. At the points at which pieces of the material block 80 have been parted off, for example, the material block 80 has recesses 86.1 to 86.6. This structure is also termed "backed ornamentation/structures".

To that extent, the material block 80 shown in FIG. 8 likewise constitutes a composite body according to the invention, which is suitable for use as a trim part having a visible surface in a motor vehicle. The recesses 86.1 to 86.6 constitute, on the one hand, an efficiently realized, individual machining of the surface of the trim part, in that contours are varied individually in the skive-splitting process. On the other hand, it is possible, for example, for finger guides or the like to be provided, through each or some of the recesses 86.1 to 86.6, for actuating elements, for example push-buttons or the like, present within the recesses 86.1 to 86.6. In the material block 80, in particular in the region of the recesses 86.1 to 86.6, there can be pressure-sensitive elements that realize a functional action of the recesses 86.1 to 86.6 in the composite body.

In the embodiment shown in FIG. 8, a distinction can be made between incorporated backing and reusable backing. In the case of the incorporated backing, nubs or a contour template remain in the part, whereas, in the case of the reusable backing, corresponding elements are reused.

Depending on the type of material and the shape of the insert materials, for example the material density, the size of the insert component or other material properties, a topography is obtained that is dependent thereon. In this case, in particular, rubber, elastomers, polymers, TPU, TPE, PVC, leather, natural fiber material, multilayer leather, wood, cork, metal, textiles, chitin-containing materials (e.g. muscles, tortoise-shell), cellulose or paper can be used.

In the case of a backing that is transparent to light, a lamp or a switch is backed. The lamp or switch can be flat, contoured or a nub, the lamp being constituted, for example, by LED, OLED, lighting film, lighting lacquer, etc. The lamp can also be of a multilayer structure, it being possible, in particular, to provide an upper wear layer that is transparent to light. The wear layer in this case can be worn away without impairment to the functioning of the lamp or damage to the latter. A corresponding wear layer can also be provided on a switch, which is constituted, for example, by a piezoelectric switch, an electromagnetic switch, etc.

In particular, also, light-transparent layers can be colored. In addition, they can be flat, contoured or provided with nubs. A colored, light-transparent layer can also be constituted, for example, by a transparent layer provided with a colored layer (e.g. film, lacquer, imprint). The colored layer in this case can be transparent to light or can scatter light, and be provided over the entire surface or only partially.

Materials that are transparent to light or that absorb light can also be used as backing materials. Materials that absorb light are also suitable for obtaining electrical energy from irradiated light energy.

As in the case of a material block according to another embodiment, preferably several differing backed ornamentation parting-off layers, i.e. also composite bodies, can be produced from one ornamentation "mother block". In addition, a composite body can also consist only of at least two layers. Preferably, further layers are not subsequently parted off, even if this is clearly possible and also to be preferred in particular situations.

Surface inclusions can also be used as translucent optical elements. Such surface inclusions can be set into the material block or used in the manner of a template to machine the material block and then subsequently removed.

It is thereby possible, on the one hand, to produce conventional inlays by producing a cut-out in a composite body and/or material block, and inserting a well-fitting inlay part of any material into the cut-out. On the other hand, inlay-like effects, so-called "undefined inlays" can also be produced through selective layering of materials and subsequent trimming.

As a further embodiment, "columns" having a defined or random cross-section can be produced. The columns can be created by forming methods, casting, foaming, extrusion, pressing methods or by mechanical machining, such as milling and grinding.

The columns can be composed of "multilayer leather" such as, for example, a composite body. This can be effected by layering and rolling up several layers of leather or other flexible decorative material. For rolling up, it is also possible to use a core part having a selected cross-section that defines the outer cross-section of the roll.

In the production of columns, a polymer (PUR, resin, etc.) or polymer fiber or powder mixture are preferably used in the case of the forming methods of casting, foaming, extrusion, pressing methods. The fibers or the powder can be composed, for example, of a wood, cellulose, paper, natural fiber, leather powder fiber, cork, textile fiber or also nonwoven fabric.

The columns can be shaped bodies of varying cross-section, or solid profiles or hollow profiles. In this case, transparent or light-guiding material, for example in the form of a further column or in the form of "fillers" can also be embedded in the columns.

The columns can then be inlaid in a material block and/or composite body, fitted, inserted or pressed into a material block, and the material block, on the one hand, can be created according to the present invention, or can also be composed of wood, polymer, a filler or the like. In addition, a material block can also be produced by joining together a plurality of columns. The material block can then be joined together, for example, by form closure ("jigsaw-puzzle effect") or material closure or a combination thereof.

Preferably the material pieces of the material block differ from one another in their color. In addition, however, it is also possible, alternatively and additionally, for individual material pieces to differ from one another in their structure, their material, their shape, etc.

The material pieces can be bonded to one another, for example, by means of hot-melt or dispersion adhesives. Alternatively, however, it is also possible to use other adhesives.

Preferably, a composite body is sealed after being applied to the visible surface of the trim part or also, alternatively, it is sealed beforehand. On the one hand, a spraying or casting process is suitable for this purpose and, on the other hand, it is also possible to apply a film to the composite body, for example by means of a thermoforming process. The sealing can be provided on the visible side, in order to protect the finished trim part against external influences such as irradiation, dirt or moisture, or in order to create additional optical effects (e.g. representation of a grain pattern in the sealing layer). Alternatively, it is possible to apply a back-side sealing, which serves, for example, to reinforce the composite body and improve its processability. It is also conceivable, clearly, to provide a sealing on both the visible side and the back side.

In addition to the bonding, material pieces, which are leather layers, can also be rendered more solid by back-filling or back-pressing, preferably being provided with a polymer. The thicker the leather is, the more slack the leather structure becomes on the lower-quality side, i.e. the side opposite the high-quality surface. The thicker the leather structures, therefore, the more worthwhile it becomes to back-fill or back-press for solidification. For the material block, thickness of 0.3 mm to 1.0 m are obtained, preferably in the range from 0.4 mm to 0.5 m, the thickness direction, in the case of flat leather layer elements that have been joined together, running substantially perpendicularly in relation to the lateral extent of the leather layers. The composite body can also be coated with a transparent polymer, and the surface can also be embossed.

Also possible, besides skiving and skive-splitting, are splitting, grinding, sawing, milling, pressing, embossing, laser-processing, cutting, polishing, chemical stripping and general enhancement processes. Machining of the leather refers to the removal of material of a single layer or the machining of the multilayer material block.

The material block can be machined to create parts having a two-dimensional or three-dimensional structure. A part having a two-dimensional structure is obtained, for example, in the case of a composite body being parted off from the material block from FIG. 1, along the cutting plane 14. The resultant composite body 20 is shown in FIG. 2. A composite body shape having a three-dimensional structure is obtained, for example, in the case of a cut being made through the material block 40 from FIG. 4, along the cutting lines 46 and 48.

Besides individual layer, it is also possible for entire blocks to be cut out from the material block, such that the extent of the composite body need not necessarily be substantially two-dimensional.

The invention claimed is:

1. A method for producing a motor vehicle trim part comprising:
    defining a shape of a plurality of differing material pieces to cause a variation of thickness of at least one material piece,
    joining together the material pieces to form a material block, wherein at least one light guide is located between at least two adjacent material pieces
    partitioning the material block to form at least one composite body including a plurality of the joined material pieces,
    filling, at least in part, the at least one composite body with a light transparent polymer,
    applying the at least one composite body to a base to form a visible surface of the trim part, the material pieces being disposed next to one another along the surface, and
    sealing the visible surface after applying the at least one composite body to the base.

2. The method according to claim 1, wherein the flexible decorative material is leather.

3. The method according to claim 1, wherein the material pieces are joined flatly to one another.

4. The method according to claim 1, wherein the material pieces are randomly shaped in three dimensions.

5. The method according to claim 1, wherein the material pieces are of differing shapes.

6. The method according to claim 1, wherein the material pieces are joined together by an adhesive.

7. The method according to claim 1, wherein the material pieces are joined together to create a substantially rectangular or cylindrical material block.

8. The method according to claim 1, wherein the at least one light guide comprises partially light-transparent or light-transparent material.

9. The method according to claim 1, wherein the material pieces have flat layers of a thickness between 0.15 mm and 10.0 mm.

10. The method according to claim 9, wherein the material pieces have flat layers of a thickness between 0.4 mm and 1.4 mm.

11. The method according to claim 1, wherein the partitioning is performed by cutting along a surface that intersects a plurality of the material pieces.

12. The method according to claim 11, wherein an alignment of the surface along which partitioning occurs is selected randomly.

13. The method according to claim 1, wherein the at least one light guide comprises a functional layer.

14. The method according to claim 13, wherein the functional layer comprises a partially light-transparent layer or a light-transparent layer.

15. The method according to claim 1, wherein the at least one light guide is provided in one or more recesses in the material block.

16. The method according to claim 15, wherein the one or more recesses are provided between adjacent material pieces.

17. The method according to claim 1, further comprising providing the material block with one or more elements that guide air.

18. The method according to claim 17, wherein the one or more elements that guide air include one or more recesses in the material block.

19. The method according to claim 18, wherein the one or more recesses are provided between adjacent material pieces.

20. The method according to claim 1, wherein the at least one composite body is brought into a constrained position by applying a force on at least one of the plurality of material pieces of the at least one composite body.

21. The method according to claim 20, wherein at least one composite body is brought into a constrained position by a template.

22. The method according to claim 1, wherein a contour of the material block is defined by an auxiliary part.

23. The method according to claim 22, wherein the auxiliary part is half-moon-shaped or wave-shaped.

* * * * *